United States Patent

Vetter et al.

[11] Patent Number: 6,064,719
[45] Date of Patent: May 16, 2000

[54] ROTARY-ANODE X-RAY TUBE INCLUDING A SLEEVE BEARING

[75] Inventors: Axel Vetter, Hamburg, Germany; Leonardus P. M. Tielemans; Bernardus W. J. Wassink, both of Eindhoven, Netherlands

[73] Assignee: U.S. Philips Corporation, New York, N.Y.

[21] Appl. No.: 09/121,575

[22] Filed: Jul. 23, 1998

[30] Foreign Application Priority Data

Aug. 1, 1997 [DE] Germany .......................... 197 33 274

[51] Int. Cl.[7] ................................................. H01J 35/10
[52] U.S. Cl. .......................... 378/132; 378/125; 378/126; 378/144
[58] Field of Search ................................. 378/132, 125, 378/126, 144

[56] References Cited

U.S. PATENT DOCUMENTS

| 5,068,885 | 11/1991 | Vetter ........................................ 378/133 |
|---|---|---|
| 5,381,285 | 1/1995 | Dona ........................................... 360/98 |
| 5,381,456 | 1/1995 | Vetter et al. ............................. 378/132 |
| 5,602,898 | 2/1997 | Vetter et al. ............................. 378/132 |

*Primary Examiner*—David P. Porta
*Assistant Examiner*—Allen C. Ho
*Attorney, Agent, or Firm*—Dwight H. Renfrew

[57] ABSTRACT

The invention relates to a rotary-anode X-ray tube which includes a sleeve bearing comprising an inner bearing member (9) and an outer bearing member (8). The inner bearing member itself includes three bearing portions, the first (94) of which takes up the axial bearing forces whereas the second bearing portion takes up the radial bearing forces and the third bearing portion (96) interconnects the first and the second bearing portion in such a manner that the symmetry axis (11) of the first or the second bearing portion can perform a swaying motion about the axis of rotation (10) during rotation of the two bearing members. Adequate bearing capacity is thus ensured even when the axial bearing surfaces do not extend exactly perpendicularly to the radial bearing surfaces.

10 Claims, 3 Drawing Sheets

6,064,719

ROTARY-ANODE X-RAY TUBE INCLUDING A SLEEVE BEARING

BACKGROUND OF THE INVENTION

1. Field of the Invention

The invention relates to a rotary-anode X-ray tube which includes a sleeve bearing which serves to journal the rotary anode and comprises an inner bearing member and an outer bearing member which encloses the former bearing member, the two bearing members having at least one cylindrical bearing surface for taking up radial bearing forces and at least one bearing surface which extends perpendicularly thereto so as to take up axial bearing forces.

2. Description of Related Art

An X-ray tube of this kind is known from U.S. Pat. No. 5,068,885. Therein, the bearing surfaces for the axial bearing forces must extend as exactly at right angles as possible to the cylindrical bearing surfaces for the radial bearing forces. This requirement can be satisfied only approximately, even should an all-out manufacturing effort be made. Therefore, for the proportioning of the bearing surfaces, notably for the axial bearing, the fact must be taken into account that the bearing surfaces in the two bearing members do not extend exactly parallel to one another, leading to a lower bearing capacity. Therefore, the bearing surfaces must be larger than would be required per se, so that the structural volume of the bearing members is increased.

SUMMARY OF THE INVENTION

It is an object of the present invention to improve a rotary-anode X-ray tube of the kind set forth in such a manner that the manufacturing effort and the volume of the bearing members are reduced.

This object is achieved according to the invention in that the inner bearing member comprises three bearing portions, the first bearing portion taking up the axial bearing forces whereas the second bearing portion takes up the radial bearing forces and the third bearing portion interconnects the first and the second bearing portion in such a manner that the symmetry axis of the first and the second bearing portion can perform a swaying motion about the axis of rotation during rotation of the sleeve bearing.

The invention is based on the idea that the cylindrical bearing surfaces in the two bearing members can be manufactured in such a manner that they exhibit hardly any measurable deviations from the exact cylindrical shape and have the specified diameters. Similarly, the axial bearing surfaces can be manufactured in such a manner that hardly any deviations can be detected in respect of plane-parallelism, thicknesses and smoothness. However, the requirement in respect of right angles between the two bearing surfaces cannot be satisfied with the same precision.

Therefore, when the bearing surfaces for the axial and the radial bearing forces do not extend exactly perpendicularly to one another in the outer bearing member, the first or the second bearing portion of the inner bearing member will perform a swaying motion about the axis of rotation during rotation of the sleeve bearing according to the invention; during this swaying motion the symmetry axis moves around the axis of rotation along a conical surface once per revolution of the sleeve bearing. In each phase of the revolution the bearing surfaces, or the symmetry axes, of the two bearing members extend parallel to one another. Consequently, an optimum bearing capacity is ensured, even when the bearing surfaces for the axial bearing forces in the outer bearing member have not been manufactured so as to extend exactly at right angles to the bearing surfaces for the radial bearing forces. Therefore, the dimensions of the sleeve bearing for the same bearing capacity can be reduced.

It is to be noted that U.S. Pat. No. 5,381,285 already describes a bearing arrangement for a fixed plate in which adjustment of the radial and the axial bearings involves a comparatively large force and the inner bearing member is constructed as one piece and has a zone of reduced diameter between the two bearings. Such a construction cannot be used in an X-ray tube in which the bearings consist of metal (for example, molybdenum) and must take up comparatively high torsional forces and in which the bearing must operate with a vertical as well as with a horizontal axis of rotation.

In a preferred embodiment of the invention, inner bearing member consists of at least three portions. In a particularly simple embodiment, due to the spherical zone, the disc can be pivoted not only about the axis of the pin, but also, for example about an axis extending perpendicularly thereto. In another embodiment a particularly simple method is employed for locking the pin in the bore in the second bearing portion.

In a further embodiment, the first and the third bearing portion co-operate as a hinged bearing.

The invention also encompasses various possibilities for arranging the first and the second bearing portion relative to one another.

The inner bearing member or the outer bearing member may in principle be connected to the tube envelope (and the respective other bearing member to the rotary-anode disc.) Preferably, the inner bearing member is connected to the X-ray envelope. This implies that the first bearing portion performs the swaying motion during a rotation. Because of its disc-like or ring-like construction, the first bearing portion usually has a lower moment of inertia in comparison with the cylindrical second bearing portion so that it can follow the revolutions of the corresponding bearing surfaces in the outer bearing member without a phase shift.

BRIEF DESCRIPTION OF THE DRAWINGS

The invention will be described in detail hereinafter with reference to the drawings. Therein.

DESCRIPTION OF THE PREFERRED EMBODIMENT

Figure 1:
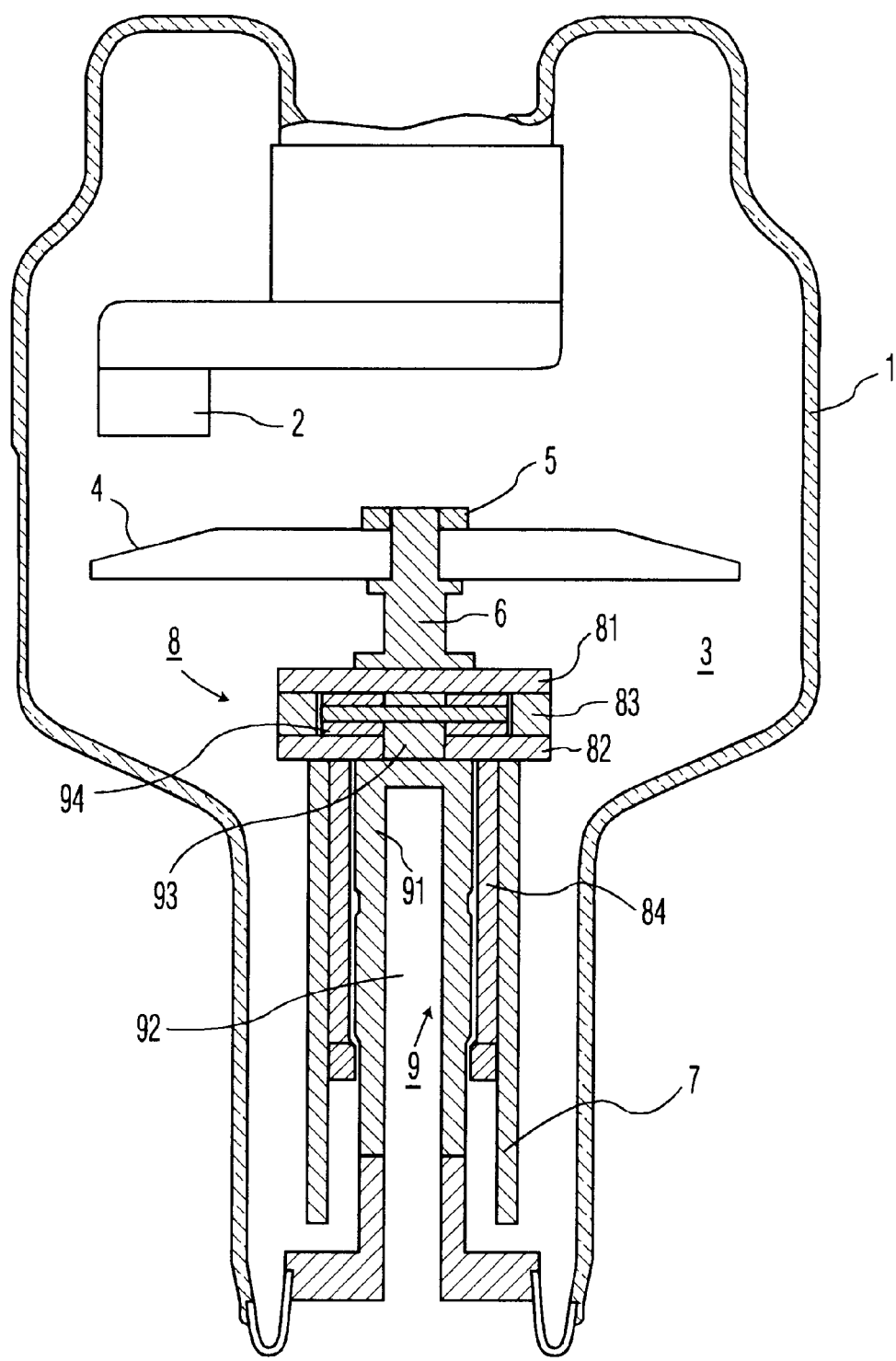
FIG. 1 shows a preferred embodiment of an X-ray tube according to the invention.

FIG. 1 shows a rotary-anode X-ray tube which includes a glass envelope 1. A cathode arrangement 2 and an anode arrangement 3 are connected to the glass envelope 1. The anode arrangement includes an anode disc 4 which rotates during operation and is connected, by way of a nut 5, to an anode supporting member 6 which is driven by a rotor 7 and is journaled in a sleeve bearing. The sleeve bearing consists of an outer bearing member 8, which rotates together with the anode disc 4 or the member 6 or the rotor 7, and an inner bearing member 9 which is secured to the tube envelope 1.

The outer bearing member includes a circular disc 81 which is connected to the member 6 and to a ring-shaped disc 82 via a spacer ring 83. The inner surfaces of the discs 81 and 82 constitute an axial sleeve bearing in conjunction with corresponding bearing surfaces in the inner bearing member 9. A hollow cylindrical part 84 which is enclosed by the rotor 7 is secured to the disc 82. The parts 81 . . . 84 of the outer bearing member 8 are rigidly connected to one another.

The inner bearing member 9 encloses a shaft 91 which has a cylindrical outer surface which is enclosed by the part 84 of the outer bearing member and the outer side of which is provided in known manner with a pattern of helical grooves (not shown in FIG. 1); a liquid lubricant (for example, a gallium alloy) is provided in the gap between the parts 91 and 84 so that these parts constitute a hydrodynamic sleeve bearing which is capable of taking up radial bearing forces. The bearing part 91 may be provided with a concentric bore 92 which can be cooled by means of a suitable cooling medium.

To the upper end of the shaft 91 there is secured a shaft 93 which is enclosed by a ring-shaped disc 94 whose outer surfaces constitute, in conjunction with the inner surfaces of the discs 81 and 84, a spiral groove bearing for axial bearing forces, a respective inner or outer surface being provided with a spiral groove pattern (not shown).

Figure 2:
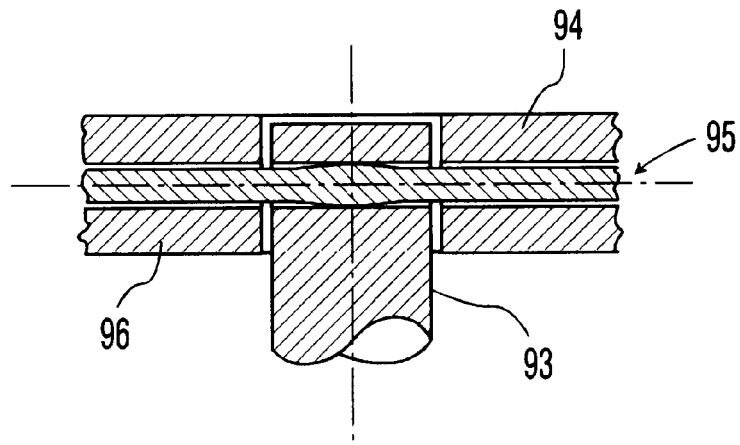
FIG. 2 shows a detail of the sleeve bearing of this X-ray tube.

As is shown in FIG. 2, the disc 94 is provided with a bore 95 which extends parallel to the disc surface and in which there is inserted a pin 96 which is guided through a further bore in the shaft 93. The central zone of the pin 96 which is situated in the bore in the shaft 93 with a small clearance is ground so as to be spherical (i.e. the longitudinal section through this pin has a finite radius of curvature at that area). Therefore, the disc 94 which is rigidly connected to the pin can be tilted out of a perpendicular position relative to the anode shaft 93 through a small angle in any desirable direction. The pin then rolls on its contact point in the bore in the shaft 93, and the disc will be aligned while requiring a negligibly small force only. The wear thus induced is minimum.

Figure 3:
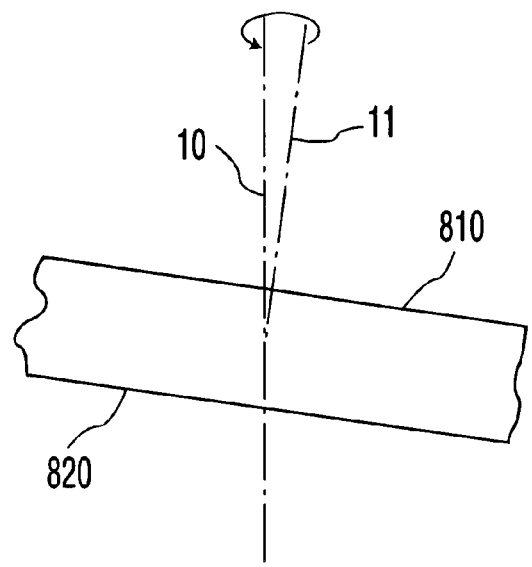
FIG. 3 shows the position of the rotation and symmetry axis occurring if the bearing lacks right-angledness.

FIG. 3 illustrates the conditions liable to occur in such a bearing when the inner surfaces of the discs 81 and 82 do not extend exactly perpendicularly to the bearing portion 84. The symmetry axis of the bearing portion 84 forms the axis of rotation 10 of the sleeve bearing. The inner surfaces of the discs 81 and 82 are denoted by the references 810 and 820, respectively, and intersect the axis of rotation at an angle other than 90°. The disc 94 adapts itself to this inclined position; its symmetry axis 11 then encloses an angle other than 0° relative to the axis of rotation 10 (for the sake of clarity, this angle is exaggerated in FIG. 3; in reality it amounts to only a fraction of 1°). Upon rotation, the surfaces 810 and 820 continuously change their position in space; this motion is followed by the disc 94 while its symmetry axis 11 precesses about the axis of rotation 10 at the frequency of rotation.

It is particularly attractive when, unlike the representation in the drawing, the axial bearing and the radial bearing have approximately the same outer diameter. In that case the axial and radial bearing forces will not compete for lubricant because of different centrifugal forces which would cause the bearings to extract lubricant from one another. This aspect is important notably in the case of high speeds.

Figure 4:
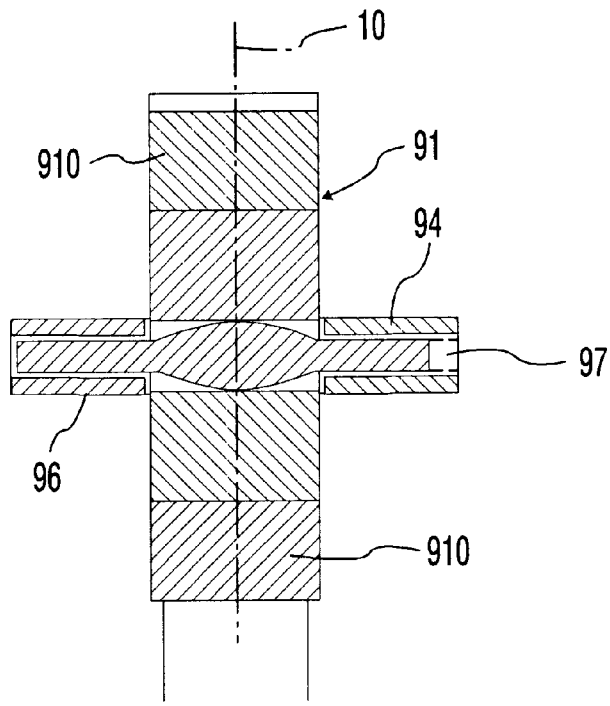
FIG. 4 shows an alternative version of the embodiment shown in FIG. 1.

The axial and the radial spiral groove bearing are offset relative to one another in the axial direction in the embodiment shown in FIG. 1. FIG. 4 shows an embodiment in which this is not the case and in which the disc 94 encloses the shaft 91 halfway between two radial spiral groove patterns 910. The pin 96, being locked in the disc 94 by way of a threaded portion 97 (the same is possible for the embodiment shown in the FIGS. 1 or 3), again has a spherical zone at its center, which zone is situated, with a small clearance, in a bore in the shaft 91; this bore extends perpendicularly to the axis of rotation 10, so that the disc 94 can be slightly tilted relative to the axis 91. However, this embodiment has the drawback that the shaft 91 must be solid and that it cannot be cooled via an internal bore as in the embodiment shown in FIG. 1.

Figure 5:
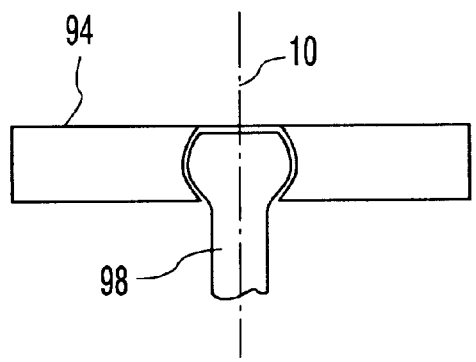
FIG. 5 shows a further embodiment according to the invention.

FIG. 5 shows a detail of a further embodiment of the inner bearing member in which the tilting of the ring 94 relative to a shaft 98 (secured to the shaft 91 not shown) is achieved in that the inner surfaces of the disc 94 which face the shaft 98 and the outer surfaces of the shaft 98 which face the disc 94 are formed as parts of a spherical surface. The parts 98 and 94 then form a hinge bearing which allows for a slight inclination of the disc 94 relative to the shaft 98.

What is claimed is:

1. A rotary-anode X-ray tube which includes a sleeve bearing which serves to journal a rotary anode of the rotary anode X-ray tube and which comprises an inner bearing member and an outer bearing member which encloses the former bearing member, the two bearing members having at least one cylindrical bearing surface for taking up radial bearing forces and at least one bearing surface which extends substantially perpendicularly thereto so as to take up axial bearing forces, wherein the inner bearing member comprises three bearing portions, the first bearing portion taking up the axial bearing forces whereas the second bearing portion takes up the radial bearing forces and the third bearing portion interconnects the first and the second bearing portions in such a manner that the symmetry axis of the first or the second bearing portion can perform a swaying motion about the axis of rotation during rotation of the sleeve bearing.

2. The rotary-anode X-ray tube as claimed in claim 1 wherein the third bearing portion is formed by a coupling member which is guided through an opening between the bearing surfaces of the first bearing portion which in turn is constructed as a circular or annular disc and is pivotably journaled on the second bearing portion or on a part rigidly connected thereto.

3. The rotary-anode X-ray tube as claimed in claim 2 wherein the coupling member is a pin which is guided through the opening which consists of a bore extending parallel to the surface of the disc, and the central part of the pin is provided with a spherical zone which is journaled in a bore in the second bearing portion or a part rigidly connected thereto.

4. The rotary-anode X-ray tube as claimed in claim 3 wherein the pin is secured in the bore in the disc.

5. The rotary-anode X-ray tube as claimed in claim 1 wherein the first bearing portion is shaped as a ring and has a spherical inner surface, that the third bearing portion has matching a spherical outer surface, and that the first bearing portion encloses the third bearing portion which is rigidly connected to the second bearing portion.

6. The rotary-anode X-ray tube as claimed in claim 1 wherein the first bearing portion and the second bearing portion are arranged so as to be offset relative to one another in the axial direction.

7. The rotary-anode X-ray tube as claimed in claim 1 wherein the first bearing portion encloses the second bearing portion in a ring-like manner.

8. The rotary anode X-ray tube as claimed in claim 1 wherein the second bearing portion is rigidly connected to the envelope of the X-ray tube.

9. A rotary-anode X-ray tube as claimed in claim 6, characterized in that the first and the second bearing portion have approximately the same diameter.

10. The rotary-anode X-ray tube as claimed in claim 3 wherein the pin is secured in the bore in the disc by means of a screwed connection.

\* \* \* \* \*